(12) United States Patent
Meis et al.

(10) Patent No.: US 8,639,433 B2
(45) Date of Patent: Jan. 28, 2014

(54) METHOD FOR SUPPORTING THE DRIVER OF A ROAD-BOUND VEHICLE IN GUIDING THE VEHICLE

(75) Inventors: Urban Meis, Lindau (DE); Christoph Wiedemann, Wasserburg (DE); Wladimir Klein, Lindau (DE); Axel Roth, Lindau (DE); Mari Joan Hilario, Lindau (DE); Steen Kristensen, Lindenberg im Allgaeu (DE); Matthias Zobel, Wasserburg (DE)

(73) Assignee: Conti Temic microelectronic GmbH, Nuernberg (DE)

( * ) Notice: Subject to any disclaimer, the term of this patent is extended or adjusted under 35 U.S.C. 154(b) by 0 days.

(21) Appl. No.: 13/514,189

(22) PCT Filed: Dec. 7, 2010

(86) PCT No.: PCT/DE2010/001416

§ 371 (c)(1),
(2), (4) Date: Jun. 6, 2012

(87) PCT Pub. No.: WO2011/069488

PCT Pub. Date: Jun. 16, 2011

(65) Prior Publication Data

US 2012/0245832 A1    Sep. 27, 2012

(30) Foreign Application Priority Data

Dec. 9, 2009   (DE) .................... 10 2009 057 553

(51) Int. Cl.
*G06F 19/00*   (2011.01)
(52) U.S. Cl.
USPC ........................................... 701/116
(58) Field of Classification Search
USPC .................................. 701/116, 409
See application file for complete search history.

(56) References Cited

U.S. PATENT DOCUMENTS 6,560,529 B1    5/2003 Janssen
8,144,033 B2 *  3/2012 Chinomi et al. ............. 340/937

FOREIGN PATENT DOCUMENTS

DE    103 11 240       9/2004
DE    103 43 941       5/2005
DE    102005052175  *  5/2007
DE    102007002562     7/2008

(Continued)

OTHER PUBLICATIONS

International Search Report of the International Searching Authority for International Application PCT/DE2010/001416, mailed Mar. 31, 2011, 2 pages, European Patent Office, HV Rijswijk, Netherlands.

(Continued)

*Primary Examiner* — Tuan C. To
*Assistant Examiner* — Aaron L Troost
(74) *Attorney, Agent, or Firm* — W. F. Fasse

(57) ABSTRACT

To support a driver in guiding a road vehicle, the lane markings of the road, traffic signs and/or vehicle license plates are detected by an environment sensor system, which produces corresponding image data, which is evaluated by an image evaluation system by comparison to stored country-specific data. From that evaluation, at least one country estimation signal is generated in an image processor, and then a country signal indicating the current location of the vehicle is generated from the at least one country estimation signal by a microprocessor. The country signal correspondingly activates a driver information device outputting country-specific information for guidance of the vehicle and/or the country signal is fed to a driver assistance system that supports the guidance of the vehicle.

16 Claims, 1 Drawing Sheet

(56) References Cited

FOREIGN PATENT DOCUMENTS

| DE | 102007010013 | 9/2008 |
| DE | 102009039450 | 5/2010 |
| EP | 1 114 371 | 7/2001 |
| EP | 2 116 984 | * 11/2009 |
| EP | 2116984 A1 | * 11/2009 |

OTHER PUBLICATIONS

PCT International Preliminary Report on Patentability, including English Translation of PCT Written Opinion of the International Searching Authority for International Application PCT/DE2010/001416, issued Jun. 12, 2012, 8 pages, International Bureau of WIPO, Geneva, Switzerland.

German Search Report for German Application No. 10 2009 057 553.7, dated Oct. 18, 2010, 4 pages, Muenchen, Germany, with English translation, 4 pages.

PCT Examiner Andrew Coffa, International Search Report of the International Searching Authority for International Application PCT/DE2010/001416, mailed Mar. 31, 2011, 2 pages, European Patent Office, HV Rijswijk, Netherlands.

PCT Examiner Andrew Coffa, PCT International Preliminary Report on Patentability, including English Translation of PCT Written Opinion of the International Searching Authority for International Application PCT/DE2010/001416, issued Jun. 12, 2012, 8 pages, International Bureau of WIPO, Geneva, Switzerland.

German Examiner Ottmar Kotzbauer, German Search Report for German Application No. 10 2009 057 553.7, dated Oct. 18, 2010, 4 pages, Muenchen, Germany, with English translation, 4 pages.

* cited by examiner

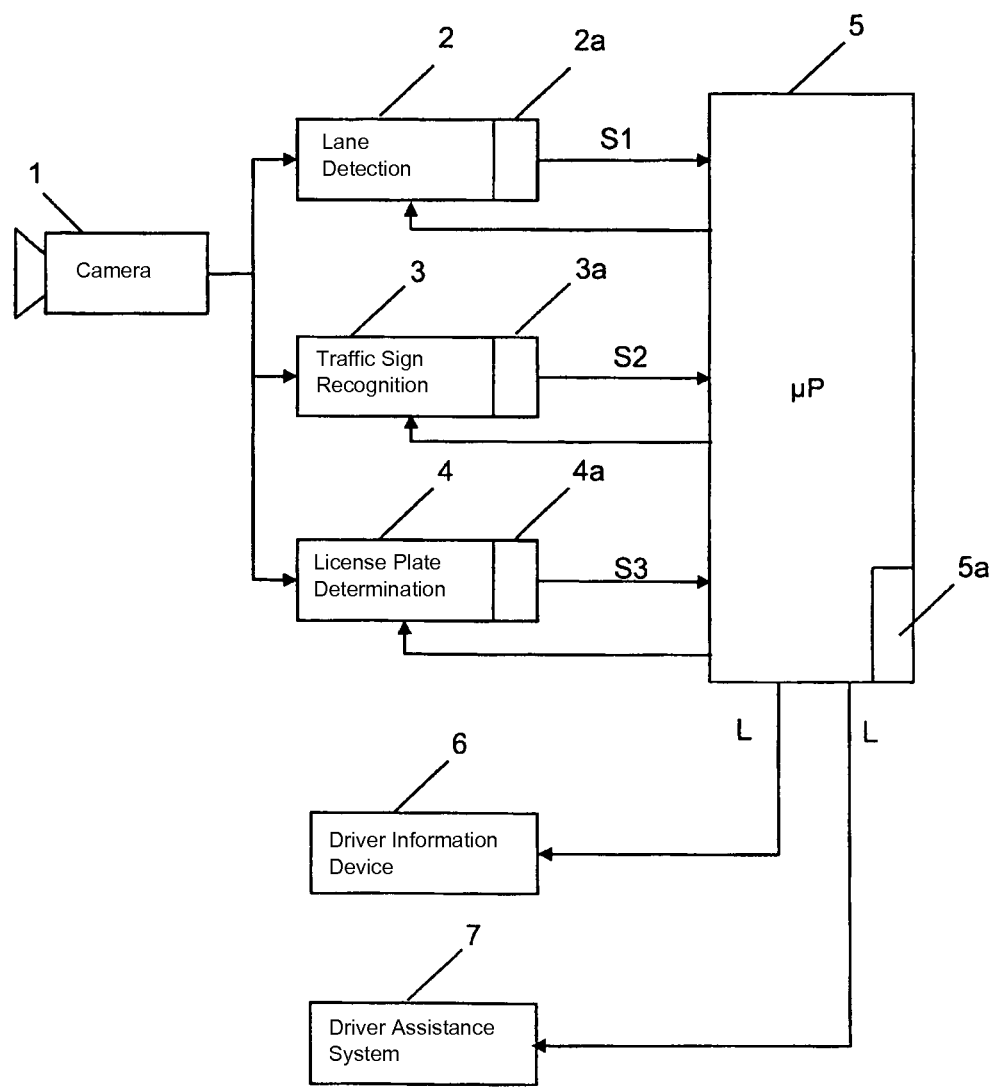

METHOD FOR SUPPORTING THE DRIVER OF A ROAD-BOUND VEHICLE IN GUIDING THE VEHICLE

FIELD OF THE INVENTION

The invention relates to a method for supporting the driver of a road-bound vehicle in guiding the vehicle along the road. The invention further relates to a device for performing the inventive method.

BACKGROUND INFORMATION

Driver assistance systems that support the driver in longitudinal and/or transverse guidance or independently perform longitudinal and/or transverse guidance are known, e.g., ACC (Adaptive Cruise Control), LDW (Lane Departure Warning), ISA (Intelligent Speed Adaption), or lane detection systems.

The essential task of such systems consists in reliably detecting the course and the lateral boundaries of the used lane, particularly in reliably (i.e., particularly at a low rejection rate) identifying traffic signs with regard to the ISA function.

From DE 103 11 240 A1 a vehicle tracking device is known, in which markings that delimit the pavement or the lanes are detected and evaluated by means of an environment sensor system and by means of evaluation means, wherein country-specific marking regulations for pavement marking are stored in a memory device. A navigation device by means of which the position of the vehicle is determined is provided for using these data.

Furthermore, in the method known from DE 103 43 941 A1, the changing traffic regulations are outputted after the crossing of a national boundary or when a national boundary is going to be crossed. This comprises, e.g., a regulation for a light control of the vehicle or a regulation for a speed limit of the vehicle. The position of the vehicle is determined by means of a navigation device (particularly by means of a satellite) in this known method as well.

A method for traffic sign recognition including the additional use of navigation data is known from, e.g., EP 1 114 371 B1. In this method, traffic signs are recognized in a first step, whereafter vehicle-locating navigation data are provided that are compared with each other and, if necessary, updated. For this purpose, these data are fed to an evaluation unit, a currently valid speed limit is determined, and, if necessary, control signals for a driver assistance system are generated.

However, these known methods or systems do not satisfactorily solve the problem of driver assistance systems having to adapt to country-specific features, which concerns, e.g., lane detection systems (e.g., LDW) or traffic sign recognition. For example, the recognition performance of the classifiers used in traffic sign recognition systems could be improved if a piece of information about the country in which the vehicle is traveling were available. Lane detection algorithms could also benefit from such a piece of information by using it, e.g., to eliminate any ambiguities with regard to pavement markings.

SUMMARY OF THE INVENTION

It is therefore the object of the invention to provide an improved method for supporting the driver of a road-bound vehicle in guiding his or her vehicle of the type mentioned at the beginning, by means of which it is particularly possible to reduce the number of incorrect detections with regard to lane detection and traffic sign recognition.

According to a first aspect or embodiment of the invention, a method for supporting the driver of a road-bound vehicle in guiding the vehicle, in which the markings that delimit the lanes of a road and traffic signs are detected by means of an environment sensor system and evaluated by means of an image evaluation system, provides that the image data of the environment sensor system are evaluated with regard to lane-relevant information, the detected lane-relevant information is evaluated by means of data that are stored in a memory device and that indicate country-specific lane markings, and a first country estimation signal corresponding to the current location of the vehicle is generated, a country signal that indicates the current location of the vehicle is generated from the country estimation signal by means of a microprocessor, and a driver information device for outputting country-specific information regarding the longitudinal and transverse guidance of the vehicle is activated by means of the country signal and/or the country signal is fed to at least one driver assistance system that supports the longitudinal and/or transverse guidance of the vehicle.

The country signal is preferably fed to a traffic sign recognition system and/or to a license plate determination system.

According to a second aspect or embodiment of the invention, a method provides that the image data of the environment sensor system are evaluated with regard to traffic-sign-relevant information, the detected traffic-sign-relevant information is evaluated by means of data that are stored in a memory device and that indicate country-specific traffic signs, and a second country estimation signal corresponding to the current location of the vehicle is generated, a country signal that indicates the current location of the vehicle is generated from the country estimation signal by means of a microprocessor, and a driver information device for outputting country-specific information regarding the longitudinal and transverse guidance of the vehicle is activated by means of the country signal and/or the country signal is fed to at least one driver assistance system that supports the longitudinal and/or transverse guidance of the vehicle.

The country signal is preferably fed to a lane detection system and/or to a license plate determination system.

According to a third aspect or embodiment of the invention, a method provides that the image data of the environment sensor system are evaluated with regard to the recognition of license plates of motor vehicles and a country estimation signal is generated by means of an analysis by frequency, a country signal that indicates the current location of the vehicle is generated from the country estimation signal by means of a microprocessor, and a driver information device for outputting country-specific information regarding the longitudinal and transverse guidance of the vehicle is activated by means of the country signal and/or the country signal is fed to at least one driver assistance system that supports the longitudinal and/or transverse guidance of the vehicle.

The country signal is preferably fed to a traffic sign recognition system and/or to a lane detection system and/or to a license plate determination system.

According to a fourth aspect or embodiment of the invention, a method for supporting the driver of a road-bound vehicle in guiding the vehicle, in which the markings that delimit the lanes of a road and traffic signs are detected by means of an environment sensor system and evaluated by means of an image evaluation system, provides that the image data of the environment sensor system are evaluated with regard to lane-relevant information, the detected lane-relevant information is evaluated by means of data that are stored in a first memory device and that indicate country-specific lane markings, and a first country estimation signal corresponding to the current location of the vehicle is generated, the image data of the environment sensor system are evaluated with regard to traffic-sign-relevant information, the detected traffic-sign-relevant information is evaluated by means of data that are stored in a second memory device and that indicate country-specific traffic signs, and a second country estimation signal corresponding to the current location of the vehicle is generated, a country signal that indicates the current location of the vehicle is generated from the first country estimation signal and the second country estimation signal by means of a merger module, and a driver information device for outputting country-specific information regarding the longitudinal and transverse guidance of the vehicle is activated by means of the country signal and/or the country signal is fed to at least one driver assistance system that supports the longitudinal and/or transverse guidance of the vehicle.

In this method, for determining a country estimation signal from markings that delimit the lanes of a road or for determining a first country estimation signal, lane-relevant information is detected as features, said features describing the pavement. Such features are, e.g., lane markings, characteristic roadside structures, keep-out areas, or other country-specific pavement markings.

Detailed characteristics of such features are, e.g.:
width of lane marking,
blanking intervals and segment lengths existing when lane markings are broken lines,
color of marking,
Botts' dots (lane markings) used in the USA,
characteristics of multiple markings as a combination of the above-mentioned features,
geometric proportions of markings (e.g., distance between left and right markings, width proportions in multiple markings),
special signs, e.g., direction signs located at exit ramps or where passing is prohibited,
text and characters on the road,
color of pavement,
markings on tollbooth approaches,
traffic island markings,
structural characteristics of curbstones,
structural characteristics of crash barriers,
appearance of delineators (color, geometry, properties of reflectors), and
color of road lighting.

Although some countries partially agreed on a standardization of traffic signs (Vienna Convention on Road Signs and Signals and Agreement Supplementing the Convention on Road Signs and Signals), there are considerable differences between the individual countries with regard to traffic sign characteristics. Therefore, for determining a country estimation signal from image data of traffic signs or for determining the second country estimation signal, the following features (which are examples) are detected as traffic-sign-relevant information:

country-specific traffic sign characteristics, e.g., with regard to shape, size, color, font and graphics characters, or pictographs in speed limit signs, country-specific proportions of several signs relative to each other, country-specific sequence of signs, e.g., a succession of speed limit signs to cause the driver to gradually reduce the speed in front of a construction site (e.g., 120 km, 100 km, 80 km, 60 km), country-specific presence or absence of particular signs or groups of signs, e.g., speed limit "80" or higher in England, country-specific danger signs (e.g., bend, skidding conditions), country-specific contents of traffic signs, e.g., place names, recognition and interpretation of boundary signs, and recognition and interpretation of information signs, e.g., signs located at national boundaries that indicate nation-wide speed limits.

The first and second country estimation signals derived from these mentioned and detected features are particularly advantageously linked up by means of the microprocessor (designed as a merger module) in order to achieve a high degree of hitting accuracy, i.e., a high degree of probability with regard to determining the country in which the vehicle is traveling. For this purpose, the merger module weights and selects the two country estimation signals as input values and generates the actual country signal therefrom, said actual country signal indicating the country in which the vehicle is traveling.

Country-specific information (e.g., a country-specific speed limit on motorways/freeways) is made available to the driver by means of the country signal that is fed to a driver information device.

If such a country signal is made available to a driver assistance system, it is possible to comply with country-specific traffic laws and traffic rules, e.g., with the minimum distance to the vehicle ahead by means of an appropriate country-dependent parameterization in an ACC system.

Furthermore, an implicit speed limit may be determined by using such a country signal together with determining the road class (lane-relevant piece of information) and used for vehicle speed control by a driver assistance system.

Furthermore, the country signal, together with the position of the current lane that extends within the road (lane-relevant piece of information), may serve as additional information for a navigation system, for the warning strategy of an LDW assistance system or for an ACC assistance system. The statutory distance to the vehicle ahead can be complied with in a country-specific manner by means of an ACC system.

Further, advantages of the inventive method result from the possibility of performing a dynamic adaptation of algorithms to the country-specific conditions by means of the country signal so that the share of incorrect detections is reduced.

According to an advantageous further development of the invention, the image data of the environment sensor system are evaluated with regard to the recognition of license plates of motor vehicles in order to generate a third country estimation signal therefrom by means of an analysis by frequency, which third country estimation signal is fed to the merger module.

Since various functions for driver assistance systems are usually realized in different vehicle components, the country signal may be advantageously fed to a traffic sign recognition system in order to, e.g., select traffic sign classifiers depending on the country signal or to perform a parameter adaptation of image processing algorithms, e.g., detection thresholds, depending on the country signal, whereby detection performance is decisively enhanced while reducing the share of incorrect detections at the same time.

If the country signal is fed to a lane detection system of the vehicle, a dynamic adaptation of algorithms to the country-specific conditions may be performed in order to enhance detection performance also in this system while reducing the share of incorrect detections at the same time. For example, the detection of Botts' dots may be restricted to the USA in order to avoid possible false warnings in other countries caused by Botts' dots recognition errors. A further advantage consists in the saving of computing time since special detector stages might be deactivated completely (e.g., Botts' dots detection, rectangular speed limit signs in the USA etc.).

Further advantages consist in the fact that a semantic interpretation of the scene can be derived correctly since multiple markings in Japan and Europe sometimes have opposite semantic meanings so that modeling is only possible if some knowledge of the respective country is available, i.e., by means of the country signal;

a double marking can be interpreted correctly since, e.g., passing is only allowed where the marking is a broken line inside the lane and a solid line outside the lane;

a construction site can only be recognized correctly on the basis of the color of the marking depending on the country (e.g., yellow for construction site markings in Germany and for normal markings in the USA); and the semantics of markings that are broken lines may differ from country to country and depends on, among other things, the blanking intervals/segment lengths (e.g., outer markings of freeways in Spain and France are often broken lines with long segments and short intervals).

Furthermore, it is particularly advantageous to determine, according to a further development of the invention, the unit of measurement (i.e., km/h or mph) of the numerical data detected on the traffic signs from the driving data of the vehicle, particularly from the traveling speed thereof and the detected traffic-sign-relevant information.

Furthermore, it is advantageous to detect, according to a further development of the invention, country-specific positions of the traffic signs lateral to the lane of the vehicle as well as relative to each other as traffic-sign-relevant information in order to, e.g., estimate therefrom whether vehicles drive on the left or on the right in the respective country in order to indicate this to the driver by means of the driver information device.

According to a further development of the invention, it is also advantageous to detect the color of the road lighting as a piece of lane-relevant information and to use it for the generation of the first country estimation signal.

Furthermore, it is advantageous to combine, according to a further development of the invention, countries having corresponding features in such a manner that these countries form a group of countries or a region so that, when lane-relevant and traffic-sign-relevant pieces of information are the same for several countries, a country signal that indicates these countries or a corresponding group of countries is generated by the merger module.

Storing the country signal in a non-volatile manner, particularly over a period of time between starting the vehicle engine and turning it off, is particularly advantageous.

BRIEF DESCRIPTION OF THE DRAWING

In the following, the invention will be explained in greater detail with reference to the attached single FIGURE. Said FIGURE shows a block diagram of a device for performing an exemplary embodiment of the inventive method.

DETAILED DESCRIPTION OF EXAMPLE EMBODIMENT OF THE INVENTION

Said device that is installed in a vehicle comprises an environment sensor system 1 realized in the form of a camera, a lane detection system 2 with an associated first memory device 2a, a traffic sign recognition system 3 with an associated second memory device 3a, and a license plate recognition system 4 with an associated third memory device 4a. These above-mentioned systems 2, 3 and 4 receive image data of the vehicle environment from the camera 1. The camera 1 is usually installed behind the windshield in the region of the inside rear-view mirror and is forward-directed so that both the pavement with the vehicles ahead and the verges are detected.

The lane detection system 2 comprises an image processing system that processes and evaluates the received image data. The image data of the camera 1 are evaluated with regard to lane-relevant information by comparing the detected lane-relevant information by means of data that are stored in the first memory device 2a and that indicate country-specific lane markings and generating a country estimation signal S1 corresponding to the current location of the vehicle. Said country estimation signal S1 is fed to a merger module 5 that is usually designed as a microprocessor.

The traffic sign recognition system 3 also comprises an image processing system that processes and evaluates the received image data. The image data of the camera 1 are evaluated with regard to traffic-sign-relevant information by comparing the detected traffic-sign-relevant information by means of data that are stored in a second memory device 3a and that indicate country-specific traffic signs and generating a second country estimation signal S2 corresponding to the current location of the vehicle. Said second country estimation signal S2 is also fed to the merger module 5.

Finally, the image data are also processed by the license plate determination system 4 and compared by means of the data that are stored in the memory device 4a of the license plate determination system 4 and that indicate country-specific license plates of vehicles, and a third country estimation signal S3 is fed to the merger module 5. Alternatively, the device may be realized without such a license plate determination system 4.

From these three country estimation signals S1, S2 and S3, the merger module 5 determines a country signal L that is stored in a non-volatile memory 5a of the merger module 5 at least over one period of time between starting the vehicle engine and turning it off. Said country signal L is fed to both a driver information device 6 and/or a driver assistance system 7, e.g., to an ACC system or a lane detection system that comprises, e.g., a lane keeping function and/or a lane change assistant. In particular, an ACC system can set the country-specific statutory distance to the vehicle ahead by means of the country signal and apply said distance to the corresponding control.

By means of such a driver information device 6, the driver traveling on, e.g., a freeway can be informed about the speed limit in force or about the traffic regulations and traffic rules that are in force in the respective country or about the unit of measurement (i.e., km/h or mph) of the speed indication.

Alternatively, the device according to FIG. 1 for performing the inventive method may be designed in such a manner that only the image processing system of the lane detection system 2 generates a country estimation signal S1 from which the merger module 5 generates a country signal L that is fed to both the traffic sign recognition system 3 and the license plate determination system 4.

According to a further alternative embodiment, the traffic sign recognition system 3, instead of the image processing system of the lane detection system 2, generates a country estimation signal S2 which is then fed, as a country signal L, to both the lane detection system 2 and the license plate determination system 4.

It is also possible to use only the license plate determination system 4, instead of the image processing system of the lane detection system 2, for the generation of a country estimation signal S3 so that the country signal L generated therefrom can be fed to the other systems, i.e., to both the lane detection system 2 and the traffic sign recognition system 3.

Finally, it is also possible that two of these three systems, i.e., the lane detection system 2 and the traffic sign recognition system 3 or the lane detection system 2 and the license plate recognition system 4 or the traffic sign recognition system 3 and the license plate recognition system 4, generate one country estimation signal each (S1 and S2 or S1 and S3 or S2 and S3) from which a country signal L is generated by means of the merger module 5.

REFERENCE NUMERALS 1 environment sensor system, camera
2 lane detection system
2a first memory device
3 traffic sign recognition
3a second memory device
4 license plate determination
4a third memory device
5 merger module, microprocessor
5a non-volatile memory of the microprocessor 5
6 driver information device
7 driver assistance system

The invention claimed is:

1. Method for supporting the driver of a vehicle in guiding the vehicle on a road, comprising:
   using an image sensor system, detecting at least two different types of image data of a vehicle environment outside of the vehicle, respectively differently selected from among lane marking data regarding lane markings that delimit a lane of the road, traffic sign data regarding traffic signs along the road, and license plate data regarding license plates of other motor vehicles,
   if the lane marking data are present, then performing a first evaluating of the lane marking data by a first image evaluation system with regard to detected lane-relevant information in the lane marking data, selected from a width of the lane markings, blank intervals and segment lengths of broken line lane markings, and a color of the lane markings, relative to first stored data that are stored in a first memory device and that indicate country-specific lane markings,
   from a first result of the first evaluating, if present, in the first image evaluation system generating a first country estimation signal that indicates a first estimate of a current location of the vehicle,
   if the traffic sign data are present, then performing a second evaluating of the traffic sign data by a second image evaluation system with regard to detected traffic-sign-relevant information in the traffic sign data, relative to second stored data that are stored in a second memory device and that indicate country-specific traffic signs,
   from a second result of the second evaluating, if present, in the second image evaluation system generating a second country estimation signal that indicates a second estimate of the current location of the vehicle,
   if the license plate data are present, then performing a third evaluating of the license plate data by a third image evaluation system with regard to detected license-plate-relevant information in the license plate data, relative to third stored data that are stored in a third memory device and that indicate country-specific license plates,
   from a third result of the third evaluating, if present, in the third image evaluation system generating a third country estimation signal that indicates a third estimate of the current location of the vehicle,
   in a microprocessor, by merging the plural country estimation signals, generating a country signal that indicates the current location of the vehicle, wherein the country signal is generated exclusively from only the image data,
   with the country signal, activating a driver information device outputting country-specific information regarding longitudinal and/or transverse guidance of the vehicle, and/or feeding the country signal to at least one driver assistance system that supports the longitudinal and/or transverse guidance of the vehicle.

2. Method according to claim 1, further comprising feeding the country signal to a traffic sign recognition system and/or to a license plate determination system.

3. Method according to claim 1, wherein
   the image data includes the traffic sign data, the detected relevant information includes the traffic-sign-relevant information, and the stored data include the second stored data that indicate country-specific traffic signs.

4. Method according to claim 3, further comprising feeding the country signal to a lane detection system and/or to a license plate determination system.

5. Method according to claim 3,
   comprising performing the first evaluating of the lane marking data and the second evaluating of the traffic sign data.

6. Method according to claim 5, further comprising performing the third evaluating of the license plate data.

7. Method according to claim 5, further comprising feeding the country signal to a traffic sign recognition system.

8. Method according to claim 5, further comprising feeding the country signal to a lane detection system.

9. Method according to claim 3, further comprising determining a unit of speed measurement of numerical data detected on traffic signs in the traffic sign data from driving data of the vehicle including a traveling speed thereof and the detected traffic-sign-relevant information.

10. Method according to claim 3, wherein the traffic-sign-relevant information comprises country-specific positions of traffic signs lateral to the lane and relative to each other.

11. Method according to claim 1, wherein the image data includes the lane marking data, and the lane-relevant information further includes a color of the road, which is also evaluated for the generating of the first country estimation signal.

12. Method according to claim 1, wherein, when the lane-relevant information is the same for several countries, then the first country estimation signal or the country signal indicates these several countries or a corresponding group of the several countries.

13. Method according to claim 1, further comprising storing the country signal in a non-volatile manner over a period of time between starting and switching off an engine of the vehicle.

14. Device for supporting the driver of a vehicle in guiding the vehicle on a road, comprising:
- a camera arranged and adapted to detect image data of a vehicle environment outside of the vehicle including lane markings that delimit a lane of the road and traffic signs,
- a first image processing system connected to the camera and adapted to evaluate the image data with regard to detected relevant information in the image data, including lane-relevant information, including a width of the lane markings, blank intervals and segment lengths of broken line lane markings, and a color of the lane markings,
- a first memory device that is connected to or incorporated in the first image processing system and that stores first stored data which indicate country-specific lane markings, wherein the first image processing system is adapted to evaluate the detected relevant information relative to the first stored data, and from a result thereof is adapted to generate a first country estimation signal that indicates a first estimate of a current location of the vehicle,
- a second image processing system connected to the camera and adapted to evaluate the image data with regard to further detected relevant information in the image data, including traffic-sign-relevant information,
- a second memory device that is connected to or incorporated in the second image processing system and that stores second stored data which indicate country-specific traffic signs, wherein the second image processing system is adapted to evaluate the detected traffic-sign-relevant information relative to the second stored data, and from a result thereof is adapted to generate a second country estimation signal that indicates a second estimation of the current location of the vehicle,
- a microprocessor that is connected to the first image processing system and/or the first memory device and connected to the second image processing system and/or the second memory device, and that comprises a merger module adapted to merge the first country estimation signal and the second country estimation signal, wherein the microprocessor is adapted to generate, from a merger of the first country estimation signal and the second country estimation signal, a country signal that indicates the current location of the vehicle, wherein the country signal is generated exclusively from only the image data, and
- connected to the microprocessor, at least one of a driver information device adapted to output country-specific information regarding longitudinal and/or transverse guidance of the vehicle in response to and dependent on the country signal, and/or a driver assistance system adapted to support the longitudinal and/or transverse guidance of the vehicle in response to and dependent on the country signal.

15. An apparatus for providing location information regarding the location of a vehicle driving on a road that has lanes marked by lane markings, traffic signs along the road, and other vehicles that are identified by license plates and that are also driving on the road, wherein the apparatus comprises:
- a camera mounted on the vehicle and oriented and adapted to produce image data including at least two of the following: lane marking image data representing the lane markings, traffic sign image data representing the traffic signs, and license plate image data representing the license plates,
- a first memory storing first stored data selected from country-specific lane marking data, country-specific traffic sign data, and country-specific license plate data,
- a second memory storing second stored data that is distinct from the first stored data and that is selected from the country-specific lane marking data, the country-specific traffic sign data, and the country-specific license plate data, other than the first stored data,
- a first image processing system that is connected to the camera and to the first memory, and that is adapted to evaluate the image data relative to the first stored data and in response thereto produce a first country estimation signal,
- a second image processing system that is connected to the camera and to the second memory, and that is adapted to evaluate the image data relative to the second stored data and in response thereto produce a second country estimation signal, and
- a microprocessor that is connected to the first and second image processing systems, and that is adapted to merge the first and second country estimation signals to produce therefrom a single country signal, as the location information, that identifies a country or geographical region in which the vehicle is driving, wherein the country signal is produced exclusively from only the image data.

16. A method of providing location information regarding the location of a vehicle driving on a road that has lanes marked by lane markings, traffic signs along the road, and other vehicles that are identified by license plates and that are also driving on the road, wherein the method comprises:
- using a camera mounted on the vehicle, producing image data including at least two of the following: lane marking image data representing the lane markings, traffic sign image data representing the traffic signs, and license plate image data representing the license plates,
- in a first memory, storing first stored data selected from country-specific lane marking data, country-specific traffic sign data, and country-specific license plate data,
- in a second memory, storing second stored data that is distinct from the first stored data and that is selected from the country-specific lane marking data, the country-specific traffic sign data, and the country-specific license plate data, other than the first stored data,
- using a first image processing system connected to the camera and to the first memory, evaluating the image data relative to the first stored data and in response thereto producing a first country estimation signal,
- using a second image processing system connected to the camera and to the second memory, evaluating the image data relative to the second stored data and in response thereto producing a second country estimation signal, and
- using a microprocessor that is connected to the first and second image processing systems, merging the first and second country estimation signals and producing therefrom a single country signal, as the location information, that identifies a country or geographical region in which the vehicle is driving, wherein the country signal is produced exclusively from only the image data.

* * * * *